US009639440B2

(12) United States Patent
Åström et al.

(10) Patent No.: US 9,639,440 B2
(45) Date of Patent: May 2, 2017

(54) AUTHENTICATION IN A DATA LAYERED ARCHITECTURE NETWORK

(75) Inventors: Bo Åström, Stockholm (SE); Jan Lemark, Stockholm (SE); Fredrik Lindholm, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 98 days.

(21) Appl. No.: 14/428,117

(22) PCT Filed: Sep. 14, 2012

(86) PCT No.: PCT/EP2012/068103
§ 371 (c)(1),
(2), (4) Date: Mar. 13, 2015

(87) PCT Pub. No.: WO2014/040635
PCT Pub. Date: Mar. 20, 2014

(65) Prior Publication Data
US 2015/0234721 A1    Aug. 20, 2015

(51) Int. Cl.
*G06F 11/00*    (2006.01)
*G06F 11/20*    (2006.01)
*H04L 29/06*    (2006.01)

(52) U.S. Cl.
CPC .......... *G06F 11/2033* (2013.01); *H04L 63/08* (2013.01)

(58) Field of Classification Search
CPC .................................................. G06F 11/2033
USPC ................ 714/4.3, 4.21, 4.2, 4.12, 4.1, 4.11
See application file for complete search history.

(56) References Cited

U.S. PATENT DOCUMENTS

| | | | | |
|---|---|---|---|---|
| 7,716,662 | B2 * | 5/2010 | Seiden | G06F 8/61 717/173 |
| 2002/0165944 | A1 | 11/2002 | Wisner | |
| 2006/0126501 | A1 | 6/2006 | Ramaswamy | |
| 2007/0208942 | A1 * | 9/2007 | May | H04L 63/0428 713/171 |
| 2008/0147821 | A1 * | 6/2008 | Dietrich | G06F 17/30206 709/216 |
| 2008/0220774 | A1 | 9/2008 | Fouquet | |
| 2011/0051616 | A1 * | 3/2011 | Inada | H04L 25/0204 370/252 |
| 2012/0222091 | A1 | 8/2012 | Castellanos Zamora | |

OTHER PUBLICATIONS

Asthana, et al., "System and Method for Transferring Data to Redundant Components," USSR, H1,882, Oct. 3, 2000.

* cited by examiner

*Primary Examiner* — Dieu-Minh Le (57) ABSTRACT

An apparatus configured to operate as a Backup system in a Data Layered Architecture Public Land Mobile Network. The apparatus comprises an interface for enabling a data exchange between the apparatus and a plurality of Authentication Centre Front Ends, and a memory for storing subscriber authentication data. The apparatus further comprises a processor for detecting a failure of a Data Back End and for receiving a redirected authentication data set request from an Authentication Centre Front End via the interface. The processor is further configured, in the event of a detected failure of Data Back End, to generate one or more authentication data sets in response to the request using the data stored in the memory, and send the generated data set(s) to the Authentication Centre Front End via the interface.

19 Claims, 6 Drawing Sheets

HLR, Incoming (from MSC/VLR) message parameters Send Authentication Info

HLR, Outgoing (to AUC) message parameters Send Authentication Vectors 2.8.2    SendAuthenticationVectArg Mapping in HLR Imsi from imsi — from incoming message
Number of Requested Vectors — from incoming message
Requested Priority — can be set by HLR (High, Medium, Low)
Re-Synchronisation Info — from incoming message
Requesting Domain — from Requseting Node Type

AUTHENTICATION IN A DATA LAYERED ARCHITECTURE NETWORK

This application is a 371 of international application PCT/EP2012/068103, filed Sep. 14, 2012, the disclosure of which is fully incorporated herein by reference.

TECHNICAL FIELD

The present invention relates to authentication in a data layered network architecture and more particularly to improving the resilience of authentication procedures in the event of network and apparatus failures.

BACKGROUND

Current Public Land Mobile Networks (PLMN) typically comprise a radio access network and a core network. The radio access network is responsible for providing wireless access to network users, whilst the core network is responsible, inter alia, for subscriber service access control and subscriber roaming. In the case of 2G or GSM network, a typical PLMN comprises circuit switched (CS) core network for handling voice calls and a packet switched (PS) core network for handling data. A 3G or UMTS network similarly comprises PS and CS core networks, whilst a 4G or LTE network comprises only an Enhanced Packet Core (EPC) core network. In addition, service networks may co-exist with the PS and CS core networks. One such service network is the IP Multimedia Subsystem (IMS) network. The IMS network may also be considered as a core network. In practical implementations, subscribers may roam between different radio access networks, and services may be switched between core networks, e.g. a voice call may be switched from a 3G radio access network and CS core network to a 4G network, with the same IMS core network remaining in control of the session.

Figure 1:
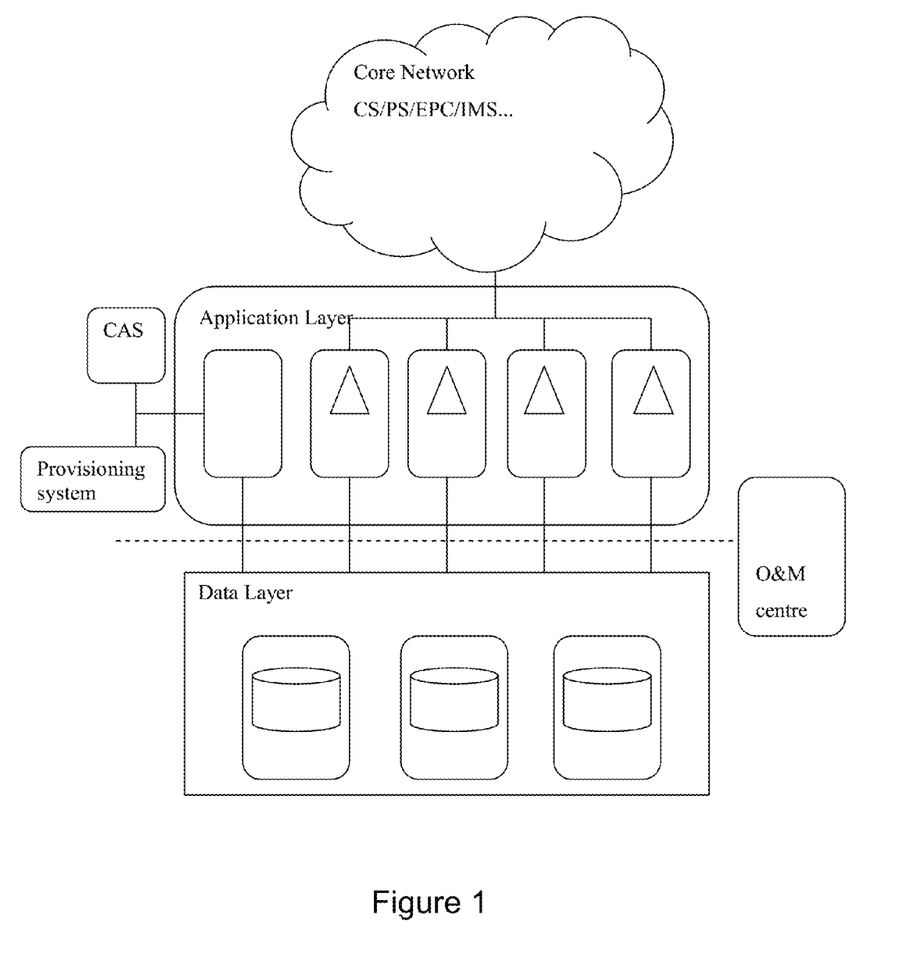
FIG. 1 illustrates schematically components of a PLMN having a Data Layered Architecture.

PLMN operators are always keen to reduce network signalling load for a given subscriber volume, to increase network resilience to failure, and to reduce the complexity and number of specialist network nodes. With this in mind, the 3GPP organisation has defined a so-called Data Layered Architecture (DLA) that splits the traditional node and network architecture introduced for GSM, UMTS and EPC in two halves; an application front end (Application-FE) and a Data back end (Data-BE). This is illustrated in FIG. 1. The Data-BE provides a highly available and geo-redundant solution to the Application-FEs that simplifies the design of applications. DLA also simplifies the routing in the core networks since any node can, if it is built as a stateless FE, serve any subscriber. The principles and advantages of DLA can be summarised as follows:
  Simplified routing to Application FEs in Core Networks
    Any Application FE can serve any subscriber
  Data & Repository Consolidation
    Several applications use the same backend (repository consolidation)
    Data de-duplication by allowing several applications to access the same data object (data consolidation)
  Scalable and Highly Available system
    Backend provides HA and Geo Redundancy
  Simple scaling of Application Front Ends
  Simplified Application Design
    Provisioning into back end database
    Dynamic allocation of subscribers to Application FEs
    Allows for stateless Application FE design
  Data Availability provided by the Backend Consider the Home Location Register (HLR) that is implemented in 2G and 3G core networks and that acts as a central database for subscriber information. The HLR stores details of subscription information generated issued by the network operator. Typically, a network will comprise a number of HLRs, each of which is assigned to a group of network subscribers. An HLR provides subscriber information to other core network nodes, such as the 2G MSC. In the traditional architecture, core network applications, such as the MSC, must identify and route signalling to the correct HLR (i.e. the HLR currently serving a given subscriber). According to the DLA architecture, an HLR-FE can serve any subscriber (i.e. all network subscribers) and network routing becomes very simple: the advanced Data-BE performs routing for the applications. Other advantages of DLA include Data and Repository Consolidation allowing databases and data-object sharing, and simplified provisioning (and removal) of subscribers within the system.

While the Data-BE is designed to provide a highly available, resilient and redundant service to the Application-FEs, extreme failure conditions may occur. If the Data-BE becomes unavailable, one problem that will occur in a mobile network is that the Core Network nodes (e.g. MSC/VLR and SGSN) will run out of authentication triplets (2G) and authentication vectors (3G). These are needed for the authentication procedure between the mobile terminal or station (MS) and the core network for mobility management signalling such as IMSI Attach and Location Update. They are also required for procedures involving users such as originating call attempts and SMS sending.

The consumption rate of authentication vectors and triplets is governed by parameter settings instructing a core network node how often authentication shall be performed (e.g. for every 5th procedure). When they have been consumed, core network nodes will start requesting new authentication data. If the Data-BE is unavailable, the rejection of authentication data will trigger re-transmission of requests that will flood the core network and the Application-FEs. Changing the parameter settings that govern how often authentication shall be performed at a given node is a manual configuration procedure and will only temporarily solve (i.e. delay) the problem. Turning off authentication in the event of a Data-BE failure will of course severely impact the network security.

SUMMARY

It is an object of the present invention to provide an apparatus and method that will improve the resilience of PLMNs to extreme failure of a Data-BE forming part of a DLA architecture.

According to a first aspect of the present invention there is provided apparatus configured to operate as a Backup system in a Data Layered Architecture Public Land Mobile Network. The apparatus comprises an interface for enabling a data exchange between the apparatus and a plurality of Authentication Centre Front Ends, and a memory for storing subscriber authentication data. The apparatus further comprises a processor for detecting a failure of a Data Back End and for receiving a redirected authentication data set request from an Authentication Centre Front End via said interface. The processor is further configured, in the event of a detected failure of Data Back End, to generate one or more authentication data sets in response to the request using the data stored in the memory, and send the generated data set(s) to the Authentication Centre Front End via said interface.

As the Apparatus is effectively quarantined from the Data-BE, and does not participate in normal traffic execution, the Backup system is unlikely to fail at the same time as the Data-BE.

The processor may be configured to detect a failure of a Data Back End by detecting a loss of connectivity with the Data Back End.

The apparatus is effective, for example, in the case where the Public Land Mobile Network is a UMTS network, and said processor is configured to generate, as each authentication data set, an authentication vector. The apparatus may comprise a second interface for enabling a data exchange between the apparatus and a primary Data Back End, said processor being further configured to obtain dynamic authentication data from a Data Back End via said first interface and to store that data in said memory as part of said subscriber authentication data. The dynamic authentication data may comprise a sequence number for each subscriber and said processor being configured to use the sequence number for a given subscriber to generate an AUTN value for inclusion in an authentication data set. In particular, the processor may be configured to add a delta value on to said sequence number in order to obtain an updated sequence number for inclusion in the AUTN value.

Alternatively, the Public Land Mobile Network may be a GSM network, and said processor is configured to generate, as each authentication data set, an authentication triplet.

According to a second aspect of the present invention there is provided apparatus configured to operate as a Vector Backup system in a Data Layered Architecture Public Land Mobile Network. The apparatus comprises a first interface for enabling a data exchange between the apparatus and a primary Data Back End, a second interface for enabling a data exchange between the apparatus and a plurality of Authentication Centre Front Ends, and a memory. The apparatus further comprises a processor for obtaining dynamic authentication data from a Data Back End via said first interface and for storing that data in said memory, and for receiving an authentication vector request from an Authentication Centre Front End via said second interface, for generating one or more authentication vectors in response to the request using the data stored in the memory, and for sending the generated vector(s) to the Authentication Centre Front End via said second interface.

According to a third aspect of the present invention there is provided apparatus configured to operate as an Authentication Centre Front End in a Data Layered Architecture Public Land Mobile Network. The apparatus comprises a first interface for enabling a data exchange between the apparatus and a primary Data Back End, and a second interface for enabling a data exchange between the apparatus and a Backup system. The apparatus further comprises a processor for detecting a failure of the Data Back End via said first interface and, in the event of such a failure, for using said second interface to obtain authentication data sets for respective subscribers.

According to a fourth aspect of the present invention there is provided method of backing up a Data Back End in a Data Layered Architecture Public Land Mobile Network. The method comprises storing subscriber authentication data in a memory, and detecting a failure of the Data Back End. The method further comprises receiving a redirected authentication data set request from an Authentication Centre Front End, and, in the event of a detected failure of the Data Back End, generating one or more authentication data sets in response to the request using the data stored in the memory, and sending the generated data set(s) to the Authentication Centre Front End.

According to a fifth aspect of the present invention there is provided computer program product comprising a computer-readable medium bearing computer program code embodied therein for use with a computer. The computer program code comprises
   code for storing subscriber authentication data in a memory;
   code for detecting a failure of the Data Back End;
   code for receiving a redirected authentication data set request from an Authentication Centre Front End, and, in the event of a detected failure of the Data Back End, for generating one or more authentication data sets in response to the request using the data stored in the memory, and for sending the generated data set(s) to the Authentication Centre Front End

DETAILED DESCRIPTION

The Data Layered Architecture (DLA) has been outlined above with reference to FIG. 1. An approach will now be described that aims to provide a backup solution for authentication triplet/vector production in case the primary system, i.e. Data-BE, becomes unavailable. This approach improves the availability of authentication data during extreme failure situations.

In a layered solution, the authentication data is stored together with other subscriber data in the Data-BE. Different applications use different parts of this consolidated user profile. An Authentication Centre (AUC) uses the authentication data to produce authentication triplets/vectors, an HLR uses the subscriber data for execution of MAP signalling procedures (e.g. transfer of subscriber data to an MSC/VLR, routing of Short Messages), etc. Data Consolidation improves data quality and provides an accurate and up-to-date view of all data used by applications and puts the operator in control of the data. The downside of the DLA approach is that this consolidated data shares fate, i.e. if the Data-BE fails, none of the FE nodes are able to function correctly. Resilience of the Data-BE can be improved by replicating the data across multiple BE servers. However, operators are concerned that in an extreme case the entire BE system may fail, e.g. due to an error that is replicated across all (identical) BE servers. The approach presented here aims to replicate dynamic authentication data from the consolidated user profile to a backup system, and to reroute requests from HLR-FEs to the backup system in the event of an extreme failure condition.

Figure 2:
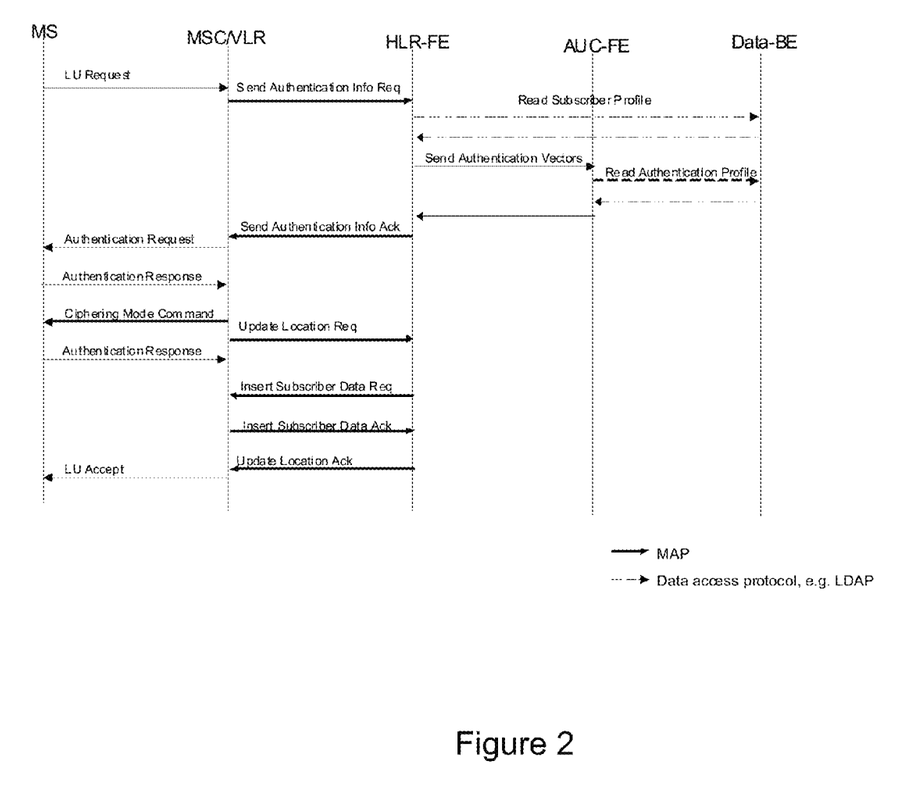
FIG. 2 illustrates a signalling sequence in the PLMN of FIG. 1 associated with a Location Update procedure.

FIG. 2 illustrates one MAP procedure in which a core network node requests authentication data from the HLR. In this example, the node is an MSC/VLR and the request relates to a Location Update procedure. Other nodes that may request authentication data include an SGSN (PS), an MME (PS), an MME-SGSN (PS), an S-CSCF (IMS), a GAN-AAA-Server and a WLAN-AAA server. However, regardless of the node and the procedure, the principle is the same for all; the HLR-FE first fetches subscriber data from the Data-BE to process the "Send Authentication Info Req", and invokes a MAP operation towards the AUC-FE if the HLR processing is successful (the fetched subscriber data is used for this purpose). The HLR-FE returns Authentication vectors/triplets to the requesting node, in this case the MSC/VLR, when these are received from the AUC-FE.

It is noted that the HLR-FE and AUC-FE are shown in FIG. 2 as separate entities with external MAP signalling. These may however be co-located in a real deployment and communicate via node internal signalling. Also, before fetching authentication vectors/triplets from the AUC-FE, the HLR a) checks if the subscriber identified by the signalled IMSI is a user served by the network operator, b) checks that the request contains all data required to process the request, and c) checks if authentication data is available for the subscriber.

Authentication triplets in GSM (2G) consist of the following parameters; RAND, SRES and Kc. On the other hand, the authentication vectors in UMTS (3G) consist of; AUTN, RAND, XRES, CK, IK. In the 3G case, the AUTN parameter contains a sequence number that is unique per requesting core network entity, e.g. MSC/VLR and SGSN. If a mobile station (MS) were to receive a sequence number that is lower than any previously used sequence number, the MS will reject the authentication challenge from the network. The security employed by 3G is stronger than that used by 2G as in the former the MS validates the network and the network validates the MS. In 2G it is only the network that validates the MS.

Figure 3:
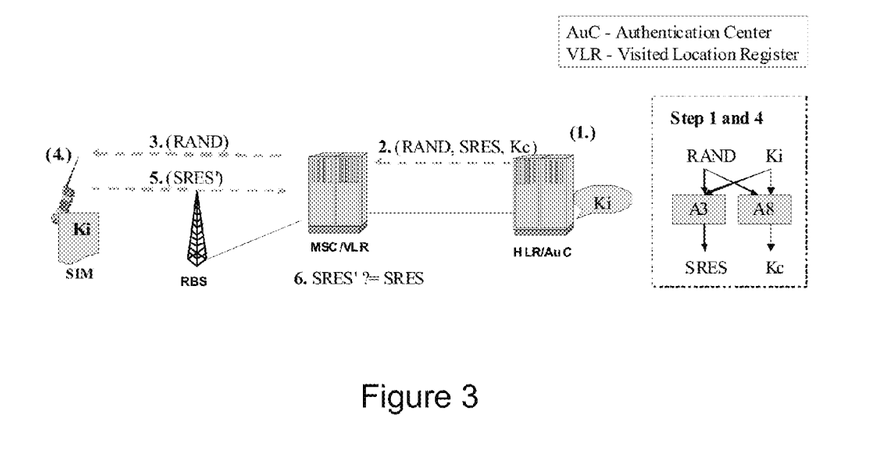
FIG. 3 illustrates an authentication procedure carried out in a GSM network.
Figure 4:
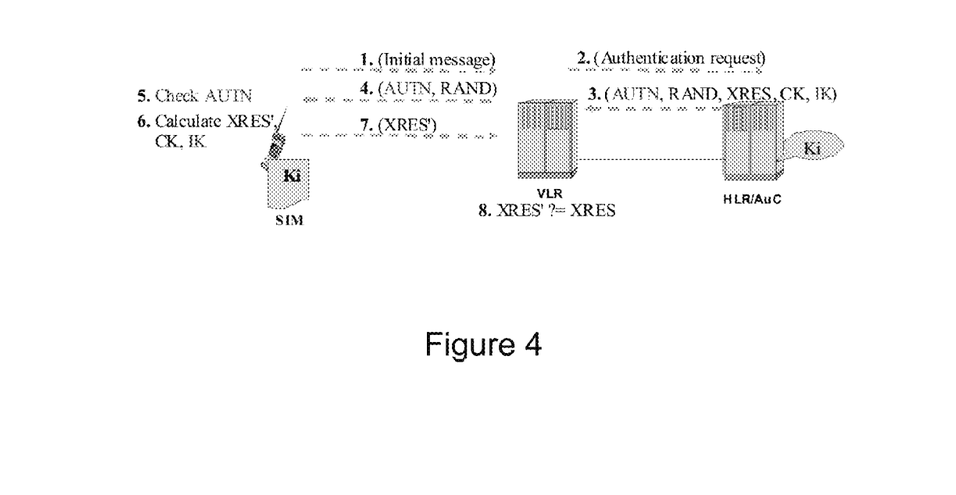
FIG. 4 illustrates an authentication procedure carried out in a UMTS network.

2G and 3G authentication procedures are shown respectively in FIG. 3 and FIG. 4 below, where 2G authentication relies upon use of a smart card SIM—Subscriber Identity Module—to provide a "Tamper proof" device containing critical subscriber information. The SIM is the entity which is authenticated by the network. A ciphering key, Kc, is created during the authentication phase. 3G authentication relies upon a Mutual Authentication Network to authenticate the user (USIM). The user (USIM) in turn authenticates the network. The network and the terminal can securely negotiate which security algorithms to use.

Figure 5:
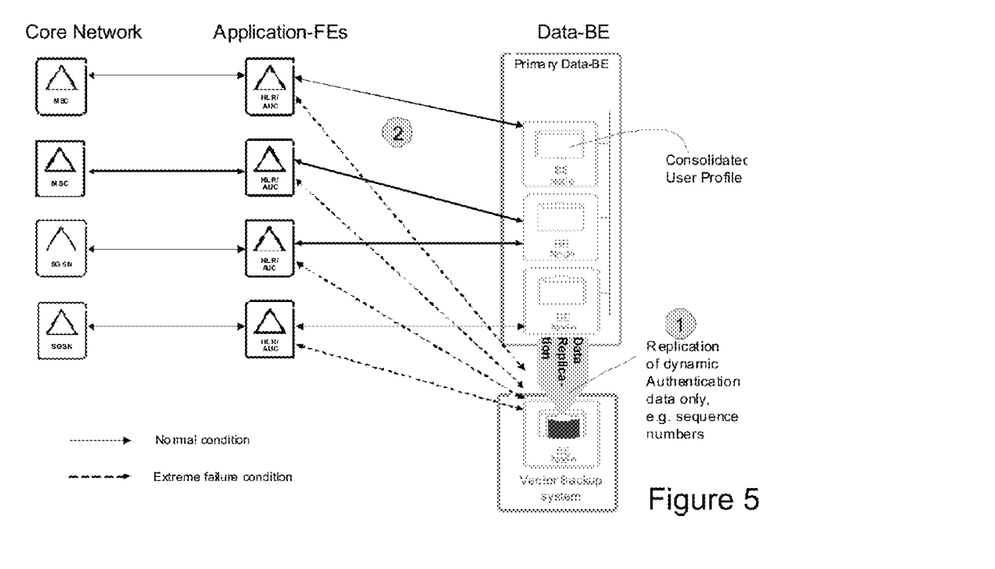
FIG. 5 illustrates schematically a resilient DLA network incorporating a Vector Backup system.

Considering firstly the 3G case, if the entire Data-BE system becomes inaccessible due to an extreme failure, the subscriber data and authentication data will not be available to the HLR and AUC FEs (FIG. 1). Any Location Update procedure (FIG. 2) will fail. Subscribers that are already registered with the network and served by an MSC/VLR will continue to have service for originating transactions as long as there are authentication vectors available in the MSC/VLR. However, when these have been consumed, the MSC/VLR will request new authentication vectors with a stand-alone Send Authentication Info Req procedure, i.e. without the coupling to location update procedure in FIG. 2. A mechanism is presented here that allows a serving MSC/VLR (or SGSN) to continue to process originating transactions while the Data-BE is inaccessible. An architecture implementing this mechanism is illustrated schematically in FIG. 5, and comprises a Vector Backup System. It is assumed that the Vector Backup System is provisioned initially with the necessary static subscriber data. This includes, for each subscriber, an IMSI and a shared secret Ki. Key features of the mechanism are:

1) Replication of the last sequence number (in AUTN) used by the primary system Data-BE to the Vector Backup system.
2) Rerouting of requests from HLR-FE to the Vector Backup system.

Considering firstly feature 1), i.e. the replication of dynamic authentication data, the Vector Backup system must be provisioned with user credentials in preparation to start producing Authentication Vectors if an extreme failure condition occurs. Generation of Sequence Numbers is described in the 3GPP Specification 33103, Annex C. The sequence number part of the AUTN is the dynamic data that must be replicated between the primary system Data-BE and the Vector Backup system. It is not required to replicate the entire consolidated user profile data. To prevent the MS refusing the Vector Backup system generated vector due to an erroneous sequence number (e.g. due to a failed replication), the Vector Backup system uses a "delta" value that is added to the last known sequence number (last replicate). Provision of the static subscriber data and replication of the dynamic subscriber data in the Vector Backup system allows the system to generate, and provide to the AUC-FE, a new authentication vector in response to receipt of an authentication vector request from the AUC-FE.

Figure 6:
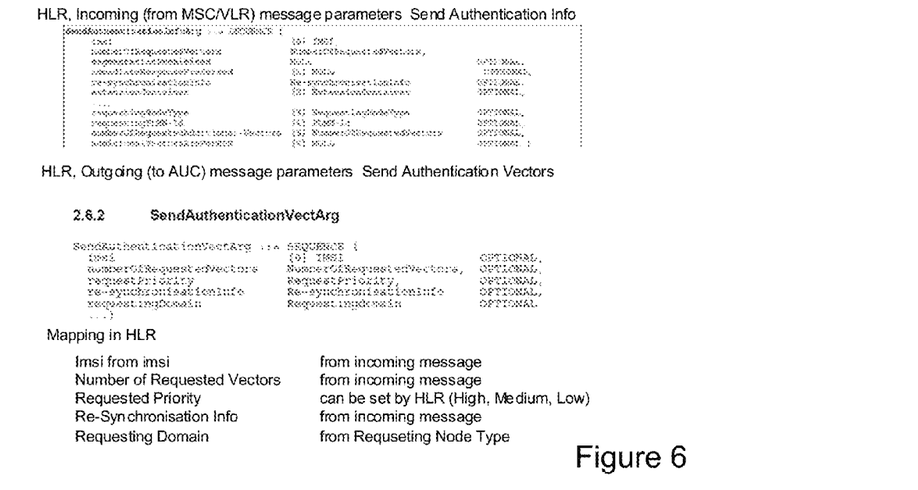
FIG. 6 illustrates the use of parameters received in an incoming MAP request to design the outgoing request to the AUC-FE, according to the signalling sequence of FIG. 2.

Considering now feature 2), i.e. rerouting of requests by the Application FE (HLR-FE), the Application-FE will detect that the primary Data-BE is inaccessible when it tries to retrieve the subscriber profile (in the event of an extreme failure). This would normally lead to a failed MAP signalling procedure. However, in the presently proposed mechanism, the procedure to retrieve an authentication vector from the AUC-FE is continued, without the checks performed by the HLR-FE (see FIG. 2). The parameters received in the incoming MAP request can be used to design the outgoing request to the AUC-FE. This is illustrated in FIG. 6.

An Application-FE (HLR) shall not reroute to the Vector Backup System until a threshold of failed signalling events (e.g. indicated by the Vector Backup system having no contact with the Data-BE) and timeouts has been reached. The Backup Vector system should not start to accept traffic unless it to has lost connectivity with the Primary Data-BE.

When the primary Data-BE has recovered, replication of dynamic authentication data shall be performed from the Vector Backup system to the primary Data-BE.

The mechanism and architecture presented here enables Authentication Vector MAP traffic to continue successfully during an extreme failure condition of the Data-BE in a DLA network. This makes it possible to process originating traffic (e.g. voice calls, SMS, etc) for subscribers that are being served by core network nodes (e.g. MSC/VLRs or SGSNs). It also prevents flooding of Authentication Vector requests towards an HLR/layered system.

Considering now the 2G case, as has been noted above, it is possible, in the event of a Data-BE failure, for the MSC/VLR or other core network node to reuse a previously used authentication triplet. This is possible because the MS does not authenticate the network during, for example, a Location Update procedure. However, reuse of authentication triplets does weaken the security of the system and it is certainly preferable to avoid such reuse. It is therefore proposed to introduce into the 2G DLA architecture a Triplet Backup system, analogous to the Vector Backup system of FIG. 5. In contrast to the Vector Backup system, the Triplet Backup system stores only static subscriber data, e.g. IMSI and Ki. As 2G AKA does not make use of a sequence number for authentication, there is no requirement for the Triplet Backup system to store dynamic subscriber data.

In both the 2G and 3G cases, the authentication Backup system is, to a large extent, quarantined from the Data-BE. In other words, the Backup system does not participate in the normal traffic execution processes: it only operates in the event of an extreme Data-BE failure. It is unlikely that a fault occurring in the Data-BE will occur simultaneously in the Backup system.

Figure 7:
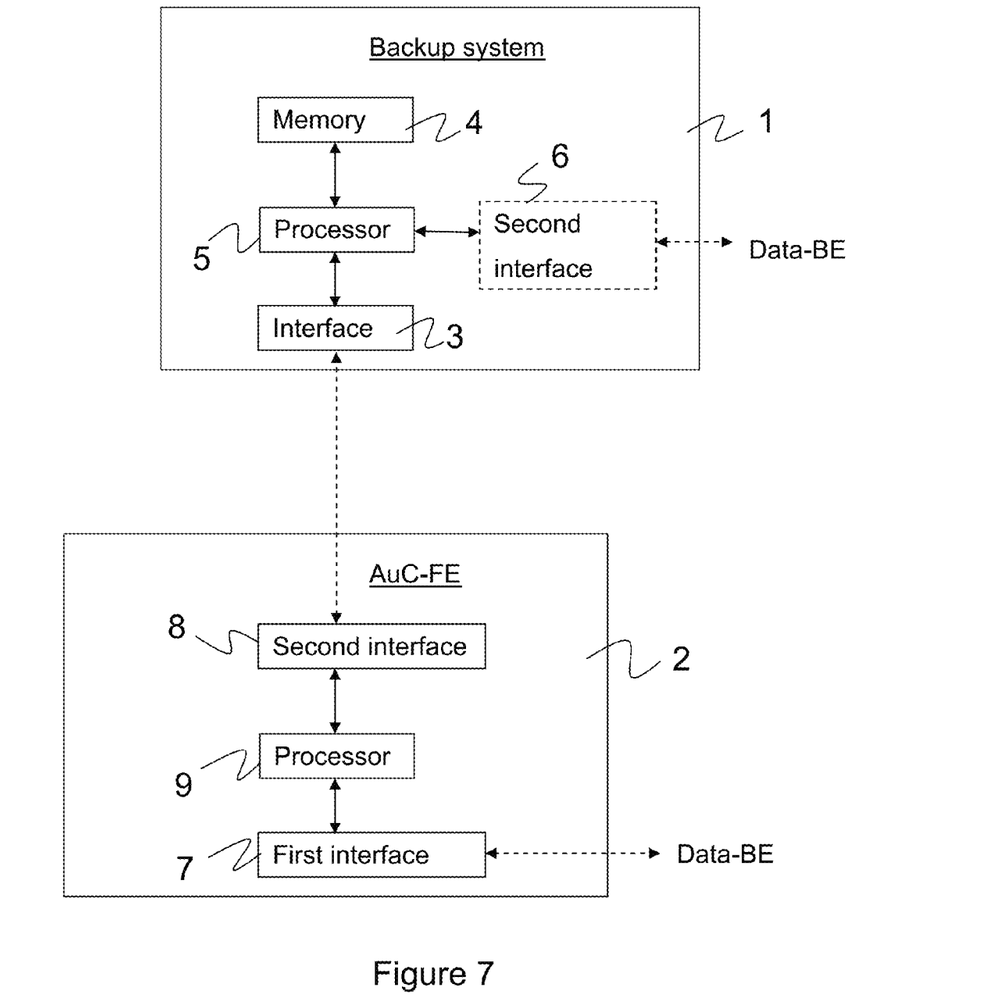
FIG. 7 illustrates schematically a Backup system and an Authentication Centre forming part of a resilient backup mechanism in a DLA network.

FIG. 7 illustrates schematically a (Vector) Backup system 1 and an Authentication Centre Front End (AuC-FE) 2. The Backup system comprises a (first) interface 3 that couples the system to the AuC-FE (in practice, the interface couples the Backup system to a plurality of AuC-FEs) to enable a data exchange between the Backup system and the Authentication Centre Front End. A memory 4 is provided for storing subscriber authentication data. The system further comprises a processor 5 for detecting a failure of a Data Back End and for receiving a redirected authentication data set request from an Authentication Centre Front End via said interface. In the event of a detected failure of the Data Back End, the processor generates one or more authentication data sets in response to the request using the data stored in the memory, and sends the generated data set(s) to the Authentication Centre Front End via the interface 3. A second interface 6 connects the Backup system to the Data BE such that the Backup system can receive dynamic subscriber data for storing in the memory 4.

The AuC-FE 2 shown in FIG. 7 comprises a first interface 7 for enabling a data exchange between the AuC-FE and a primary Data Back End. A second interface 8 is provided for enabling a data exchange between the AuC-FE and a Backup system. There is further provided a processor 9 for detecting a failure of the Data Back End via said first interface and, in the event of such a failure, for using the second interface 8 to obtain authentication data sets for respective subscribers.

Figure 8:
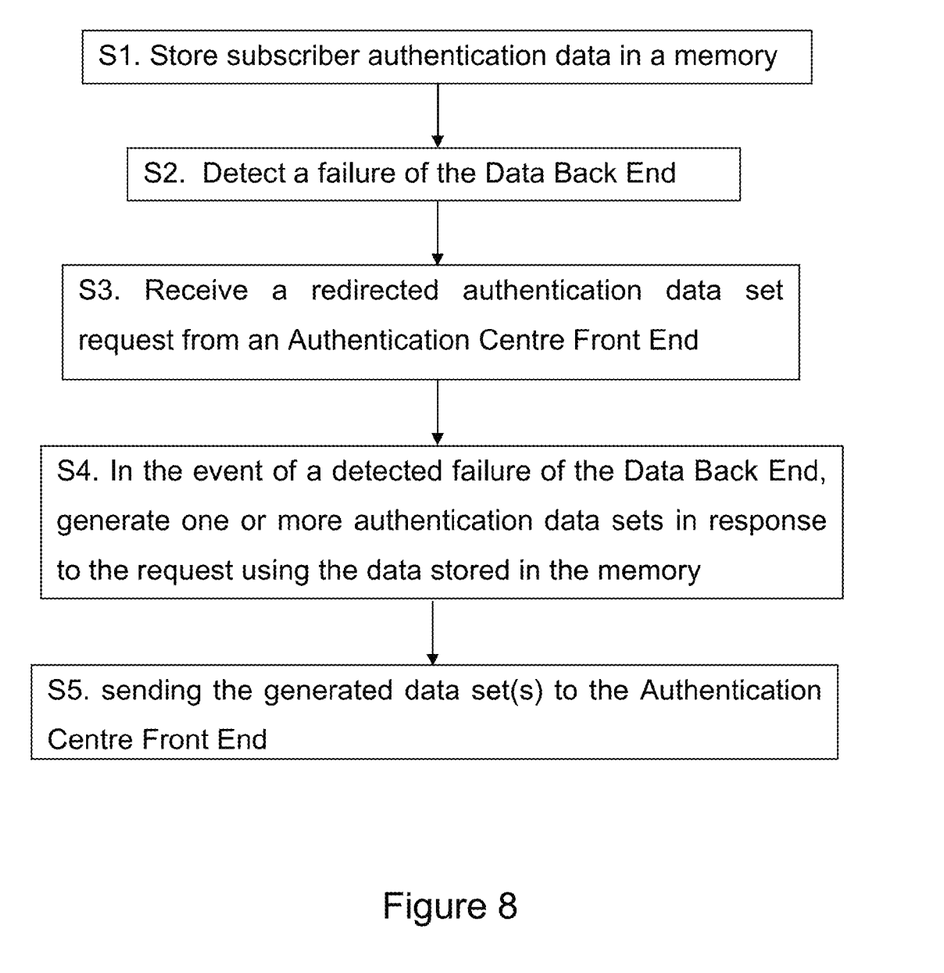
FIG. 8 is a flow diagram illustrating a resilient backup mechanism in a DLA network.

FIG. 8 is a flow diagram further illustrating a procedure for backing up a Data Back End in a Data Layered Architecture Public Land Mobile Network such as a GSM or UMTS network. At step S1, subscriber authentication data is stored in a memory (of the Backup system). At step S2, a failure of the Data Back End is detected, e.g. the AuC-FE and the Backup system both detect a loss of communication with the Data-BE. At step S3, a redirected authentication data set request is received from an Authentication Centre Front End. At step S4, in the event of a detected failure of the Data Back End, one or more authentication data sets is/are generated in response to the request using the data stored in the memory. Finally, at step S5, the generated data set(s) is(are) sent to the Authentication Centre Front End.

It will be appreciated by the person of skill in the art that various modifications may be made to the above described embodiments without departing from the scope of the present invention.

The invention claimed is:

1. An apparatus configured to operate as a Backup system in a Data Layered Architecture Public Land Mobile Network, the apparatus comprising:
    an interface for enabling a data exchange between the apparatus and a plurality of Authentication Centre Front Ends;
    a memory for storing subscriber authentication data; and
    a processor configured for:
        detecting a failure of a Data Back End;
        receiving a redirected authentication data set request from an Authentication Centre Front End via said interface; and
        when the failure of the Data Back End is detected, generating one or more authentication data sets in response to the redirected authentication data set request using the subscriber authentication data stored in the memory, and sending the generated data set(s) to the Authentication Centre Front End via said interface.

2. The apparatus according to claim 1, wherein said processor is configured to detect a failure of a Data Back End by detecting a loss of connectivity with the Data Back End.

3. The apparatus according to claim 1, wherein said memory is configured to store subscriber authentication data comprising, for each subscriber, at least an International Mobile Subscriber Identity, IMSI, and a shared secret, Ki.

4. The apparatus according to claim 1, wherein said interface is configured to exchange data with an Authentication Centre Front End using the Lightweight Directory Access Protocol, LDAP or Structured Query Language, SQL.

5. The apparatus according to claim 1, wherein said Public Land Mobile Network is a UMTS network, and said processor is further configured to generate, as each authentication data set, an authentication vector.

6. The apparatus according to claim 5, further comprising a second interface for enabling a data exchange between the apparatus and a primary Data Back End, said processor being further configured to obtain dynamic authentication data from a Data Back End via said first interface and to store that data in said memory as part of said subscriber authentication data.

7. The apparatus according to claim 6, wherein said dynamic authentication data comprises a sequence number for each subscriber, and said processor being further configured to use the sequence number for a given subscriber to generate an AUTN value for inclusion in an authentication data set.

8. The apparatus according to claim 7, said processor being further configured to add a delta value on to said sequence number in order to obtain an updated sequence number for inclusion in the AUTN value.

9. The apparatus according to claim 1, wherein said Public Land Mobile Network is a GSM network, and said processor is further configured to generate, as each authentication data set, an authentication triplet.

10. An apparatus configured to operate as a Vector Backup system in a Data Layered Architecture Public Land Mobile Network, the apparatus comprising:
    a first interface for enabling a data exchange between the apparatus and a primary Data Back End;
    a second interface for enabling a data exchange between the apparatus and a plurality of Authentication Centre Front Ends;
    a memory; and
    a processor configured for:
        obtaining dynamic authentication data from a Data Back End via said first interface and storing the data in said memory;
        receiving an authentication vector request from an Authentication Centre Front End via said second interface;

generating one or more authentication vectors in response to the request using the data stored in the memory; and sending the generated vector(s) to the Authentication Centre Front End via said second interface.

11. The apparatus according to claim 10, further comprising a detector for detecting failure of the primary Data Back End, said processor being further configured to generate and send an authentication vector or authentication vectors only in the event of a detected failure.

12. An apparatus configured to operate as an Authentication Centre Front End in a Data Layered Architecture Public Land Mobile Network, the apparatus comprising:

a first interface for enabling a data exchange between the apparatus and a primary Data Back End;

a second interface for enabling a data exchange between the apparatus and a Backup system; and a processor configured for:

detecting a failure of the Data Back End via said first interface; and when a failure is detected, using said second interface to obtain authentication data sets for respective subscribers.

13. A method of backing up a Data Back End in a Data Layered Architecture Public Land Mobile Network, the method comprising:

storing subscriber authentication data in a memory;

detecting a failure of the Data Back End;

receiving a redirected authentication data set request from an Authentication Centre Front End; and when a failure of the Data Back End is detected, generating one or more authentication data sets in response to the request using the data stored in the memory, and sending the generated data set(s) to the Authentication Centre Front End.

14. The method according to claim 13, wherein said Public Land Mobile Network is a UMTS network, and each said authentication data set is an authentication vector.

15. The method according to claim 14, further comprising receiving dynamic authentication data from a Data Back and storing that data in said memory as part of said subscriber authentication data.

16. The method according to claim 15, wherein said dynamic authentication data comprises a sequence number for each subscriber, and the method further comprises using the sequence number for a given subscriber to generate an AUTN value for inclusion in an authentication data set.

17. The method according to claim 16, further comprising adding a delta value on to said sequence number in order to obtain an updated sequence number for inclusion in the AUTN value.

18. The method according to claim 13, wherein said Public Land Mobile Network is a GSM network, and each said authentication data set is an authentication triplet.

19. A computer program product comprising a non-transitory computer-readable medium bearing computer program code embodied therein for use with a computer, the computer program code comprising instructions for:

storing subscriber authentication data in a memory;

detecting a failure of the Data Back End;

receiving a redirected authentication data set request from an Authentication Centre Front End; and when a failure of the Data Back End is detected, generating one or more authentication data sets in response to the request using the data stored in the memory, and sending the generated data set(s) to the Authentication Centre Front End.

* * * * *